FIG I

June 1, 1965

G. BISHOP 3,186,096

GAUGE UNITS FOR MACHINE TOOLS

Filed Dec. 11, 1961

2 Sheets-Sheet 2

3,186,096
GAUGE UNITS FOR MACHINE TOOLS
George Bishop, Timperley, England, assignor to The Churchill Machine Tool Company Limited, Altrincham, England, a British company
Filed Dec. 11, 1961, Ser. No. 158,516
Claims priority, application Great Britain, Dec. 28, 1960, 44,427/60
5 Claims. (Cl. 33—178)

This invention relates to means for actuating a gauge on a machine tool such as a grinding machine, to move it automatically on to the workpiece and to remove it after a measurement has been effected.

According to the invention, the gauge is arranged to be given a straight line movement to bring it near to a plane through the work axis, and a swivel movement to bring the caliper jaws of the gauge on to the workpiece and into the operative position.

The invention may also provide a means for moving the gauge longitudinally and parallel to the workpiece axis so as to bring it into position at any point along the workpiece.

Figure 1:
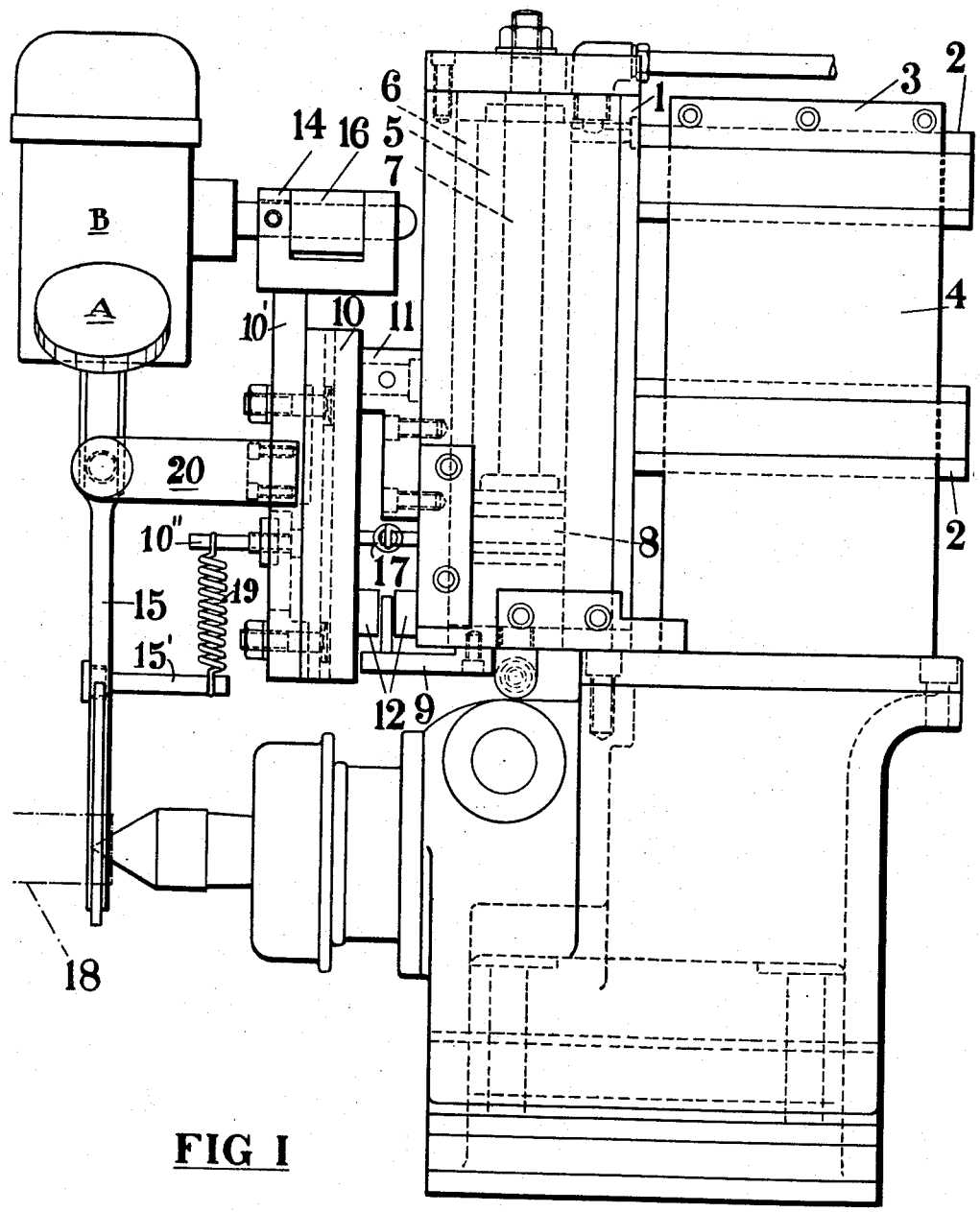
Figure 2:
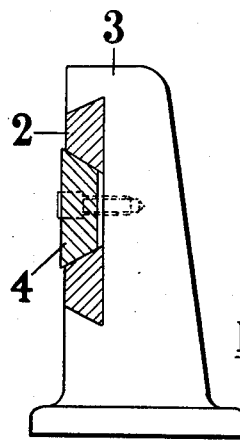
Figure 3:
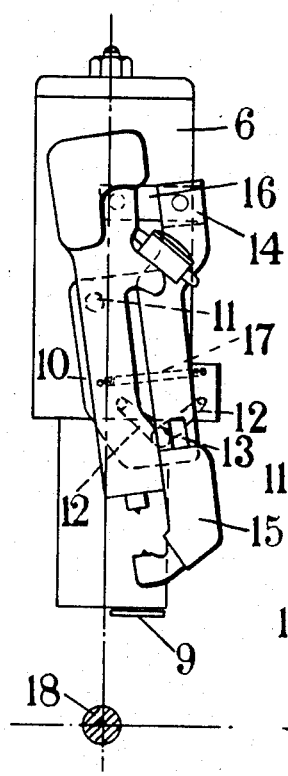
Figure 4:
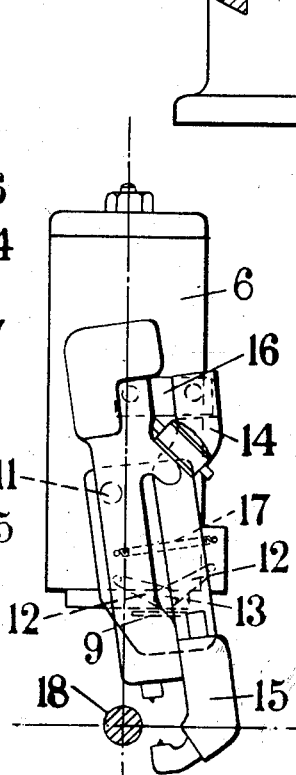
Figure 5:
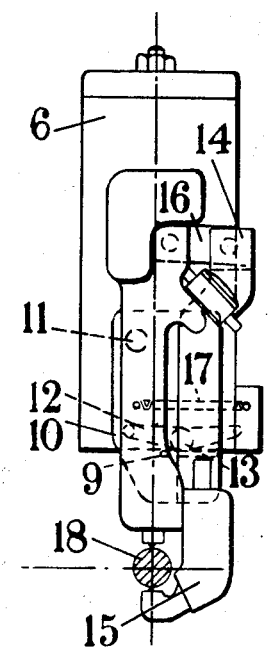

Referring to the accompanying drawings:

FIGURE 1 is a front elevation showing one convenient embodiment of the invention by way of example, FIGURE 2 is a view from one end, FIGURES 3, 4 and 5 are views from the other end, showing the device in different positions.

In the convenient embodiment illustrated, the gauge device is mounted in a bracket 1 on the tailstock of a grinding machine.

The bracket 1 is attached to the machine by dove tailed yokes 2 which fit into a dove tailed or similar recess in a fixed part 3 of the machine and are secured by a wedge-shaped clamp 4, thus providing adjustment parallel to the work axis. The bracket embodies a cylinder 5 to which hydraulic fluid or air can be admitted. A slide 6 is mounted on the bracket 1 to slide towards or away from the work axis and is secured to the piston rod 7 of a piston 8 moving in the cylinder 5. A contact platform 9 is secured to the lower end of the bracket 1.

An adjusting plate 10 is attached at its upper end to the slide 6 by a pin 11 on which it can swivel, and at its lower end by two links 12 pivoted to the plate 10 and the slide 6 and to one another, with a roller 13 at the pivot between the links 12. An element is carried at the upper end of plate 10′ which is adjustable vertically on the adjusting plate 10 and is pivotally connected to the gauge 15 by a link 16. A dial A for visual reading, and an electronic reading device B, are mounted on gauge 15. A tension spring 17 between the adjusting plate 10 and the slide 6 tends to keep the double link 12 in a bent position with the gauge held to one side of a vertical plane through the workpiece 18 as shown in FIGURE 3. A spring 19 is provided between stud 10″ on element 10′ and stud 15′ on gauge 15 to bias gauge 15 upwardly to support it and pull it against stop 20 provided on element 10′ to limit the pivoting of the gauge away from the workpiece.

When hydraulic fluid or air is admitted to the cylinder 5 the piston 8 is forced downwards and the slide 6 moves downwards on the bracket 1 carrying the gauge 15 with it. As the slide 6 approaches the bottom of its travel with the gauge 15 alongside the workpiece 18, the roller 13 at the pivot of the double link 12 strikes the contact platform 9 (see FIGURE 4) and the link is straightened out, whereby the adjusting plate 10 is caused to turn on its pin 11 and move the gauge to engage the workpiece 18 (FIGURE 5). By reversing the flow of hydraulic fluid or air to the cylinder 5 the procedure is reversed and the gauge is returned to its inoperative position.

The mechanism can be adjusted to suit workpieces of various diameters by adjusting the plate 10′ carrying the gauge with respect to the adjusting plate 10.

The mechanism can be sequenced with the movements of the machine to which it is fitted to give fully automatic control, or it can be used with non-automatic machines by using a manually controlled hydraulic or pneumatic valve to control the flow of fluid to the actuating cylinder.

What I claim is:

1. Means for actuating a gauge on a machine tool, comprising a slide arranged for straight line movement towards the work axis of the machine tool, means pivotally connected to the slide for supporting the gauge, and means engaging the gauge supporting means towards the end of the straight line movement of the slide for causing the supporting means to pivot and bring the gauge into its operative position.

2. Means as claimed in claim 1, having a bracket supporting the slide, and yokes attached to the bracket which are slidable in recesses in a fixed part of the machine tool, to enable the slide to move parallel to the work axis.

3. Means as claimed in claim 2, having a fluid-operated cylinder for displacing the slide on the bracket.

4. Means as claimed in claim 1, said means including an adjusting plate pivotally mounted on the slide, linkage mean pivoted to the adjusting plate and to said slide, and a fixed part in the path of the link for causing the adjusting plate to be turned towards the end of the straight line movement of the slide.

5. Means as claimed in claim 1, said means including an adjusting plate pivotally mounted on the slide, a link pivoted to the adjusting plate, a second link pivoted to the first link and to the slide, a spring between the plate and the slide tending to keep the pair of links in a bent position, and a fixed part in the path of the joint between the two links for causing the links to be straightened towards the end of the straight line movement of the slide, to turn the adjusting plate with respect to the slide.

References Cited by the Examiner
FOREIGN PATENTS
810,316   3/59   Great Britain.

ISAAC LISANN, *Primary Examiner.*
ROBERT L. EVANS, *Examiner.*